United States Patent Office 3,519,623
Patented July 7, 1970

3,519,623
7-AMINOPHTHALOYLPHENOTHIAZINES
Max A. Weaver, James M. Straley, and David J. Wallace, Kingsport, Tenn., assignors to Eastman Kodak Company, Rochester, N.Y., a corporation of New Jersey
No Drawing. Filed Nov. 26, 1968, Ser. No. 779,246
Int. Cl. C07d 93/12
U.S. Cl. 260—243
5 Claims

ABSTRACT OF THE DISCLOSURE

Water-insoluble phthaloylphenothiazine compounds containing an amino, alkylamino, cyclohexylamino, arylamino, or acylamino group at the 7-position and the 5-sulfoxide and 5,5-dioxide derivative thereof. The compounds are useful as dyes for hydrophobic textile materials such as cellulose acetate, polyamide, and polyester textile materials.

---

This invention relates to certain novel phthaloylphenothiazine compounds and, more particularly, to water-insoluble 7-aminophthaloylphenothiazine compounds and to hydrophobic textile materials dyed therewith.

The novel compounds of the invention have the general formula (I)

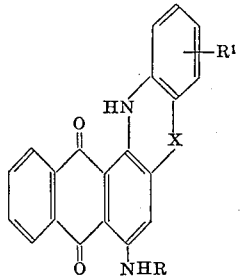

wherein

R is hydrogen, an alkyl radical having 1 to about 6 carbon atoms, cyclohexyl, a phenyl radical or an acyl radical;

$R^1$ is hydrogen, lower alkyl, lower hydroxyalkyl, lower haloakyl, lower alkoxy, halogen, phenyl, amino, lower alkanoylamino, lower alkylsulfonamido, lower alkylsulfonyl, sulfamoyl, lower alkylsulfamoyl, lower alkoxycarbonyl, nitro, or trifluoromethyl; and X is —S—, —SO— or —$SO_2$—.

The compounds of the invention are useful for dyeing hydrophobic textile materials such as cellulose acetate, polyamide and polyester fibers, yarns and fabrics. The compounds in general exhibit properties superior to those of the prior art dyes when tested by methods described in the Technical Manual of the A.A.T.C.C. For example, the novel compounds exhibit improved fastness to light and resistance to sublimation when compared with the compounds disclosed in U.S. Pat. 3,254,078. Certain of the novel compounds exhibit improved substantivity and outstanding light and gas fastness on cellulose acetate fibers. The compounds of the invention are substantially water-insoluble meaning that they are free of water-solubilizing groups.

The alkyl radicals represented by R can be straight- or branch-chain, unsubstituted or substituted alkyl. Examples of the unsubstituted alkyl groups include methyl, ethyl, propyl, isopropyl, butyl, isobutyl, etc. As used herein to describe a substituent containing an alkyl moiety, "lower" denotes a carbon content of up to about 4 carbon atoms. Halogen, hydroxy, lower alkoxy, lower alkanoyloxy, cyano, phenyl, and lower alkanoylamido are typical substituents which can be present on the alkyl radicals R. Examples of such substituted alkyl groups are 2-hydroxyethyl, 2,3-dihydroxypropyl, 2-bromoethyl, 2-chloroethyl, 2,3-dichloropropyl, 3-chloro-2-hydroxypropyl, 2-acetoxyethyl, 2-acetamidoethyl, 3-methoxyethyl, 2-cyanoethyl, benzyl, 2-phenylethyl, 2-acetamidoethyl, 3-propionamidopropyl, 3-acetamido-2-hydroxypropyl, etc. The phenyl radical represented by R can be unsubstituted or substituted, for example, with lower alkyl, lower alkoxy, hydrogen, halogen, trifluoromethyl, lower alkanoylamino, 2-pyrrolidinono, etc. The alkyl group that is present on the phenyl group can be substituted with hydroxy or lower alkoxy. Examples of the substituted phenyl groups include p-tolyl, p-anisyl, o,p-dichlorophenyl, p-2-hydroxyethylphenyl, p-hydroxyphenyl, p-2-ethoxyethylphenyl, m-trifluoromethylphenyl, p-acetamidophenyl, p-2-pyrrolidinonophenyl, etc. The phenyl radical represented by R preferably does not contain more than 2 substituents.

The acyl groups represented by R can be formyl, lower alkanoyl, aroyl, cyclohexylcarbonyl, lower alkoxycarbonyl, aryloxycarbonyl, lower alkylsulfonyl, arylsulfonyl, carbamoyl, lower alkylcarbamoyl, arylcarbamoyl, furoyl, etc. The alkanoyl groups can be substituted with halogen, phenyl, cyano, lower alkoxy, lower alkylthio, or lower alkylsulfonyl. The alkylsulfonyl groups can be substituted, for example, with cyano, halogen, hydroxy, lower alkoxy and the like. The alkoxycarbonyl can be substituted with cyano or hydroxy. Acetyl, propionyl, butyryl, cyanoacetyl, chloroacetyl, phenylacetyl, methoxyacetyl, methylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-methoxyethylsulfonyl, and 2-chloroethylsulfonyl, are examples of the alkanoyl, alkoxycarbonyl, and alkylsulfonyl groups which R can represent. The aryl group of the aroyl, aryloxycarbonyl, arylsulfonyl, and arylcarbamoyl group is preferably monocyclic, carboxylic aryl such as unsubstituted phenyl and phenyl substituted with, for example, lower alkyl, lower alkoxy, halogen, etc. Tolyl, anisyl, p-bromophenyl, and o,p-dichlorophenyl are typical of such aryl groups. Dimethylcarbamoyl, ethylcarbamoyl, propylcarbamoyl, and butylcarbamoyl are illustrative alkylcarbamoyl groups which R can represent.

Examples of the groups which $R^1$ can represent have been set forth in the description of the various alkyl, phenyl, and acyl radicals which R can represent.

Particularly good dyeings on cellulose acetate and/or polyester fibers are obtained by using compounds wherein R is hydrogen; lower alkyl; lower alkyl substituted with hydroxy, halogen or cyano; phenyl; lower alkylphenyl; lower alkylsulfonyl; phenylsulfonyl; or tolylsulfonyl;

$R^1$ is H or halogen; and

X is —S— or —$SO_2$—.

The novel compounds of the invention are prepared by procedures analogous to published techniques. A 1,4-diamino-2-bromoanthraquinone is reacted with an o-nitrothiophenol in refluxing dimethylformamide, in the presence of potassium carbonate. The nitrothiophenols are prepared according to known methtods. The compounds obtained from the above-described reaction can be alkylated or arylated to yield compounds wherein R is an alkyl or phenyl radical. The compounds can be oxidized by treating them with peracetic acid or hydrogen peroxide in acetic acid, resulting in the conversion of the sulfide group to the sulfoxide or the sulfonyl group. During the oxidation, the 7-amino group should bear an acyl substituent which, if desired, can be removed by hydrolysis subsequent to oxidation.

The preparation of the compounds of the invention will be illustrated further by the following examples.

EXAMPLE 1

1 - amino - 2 - bromo-4-(p-toluenesulfonamido)anthraquinone (9.42 g.), o-nitrobenzenethio (4.0 g.), 3.0 g. potassium carbonate, and 100 ml. N,N-dimethylformamide are stirred and refluxed for 1.5 hr. The reaction mixture is allowed to cool and then drowned in water. Acetic acid is added until mixture is neutral. The product is collected by filtration and washed with water and then acetone. The product, which melts at 245–246° C., produces blue shades on polyester fibers. It has the structure:

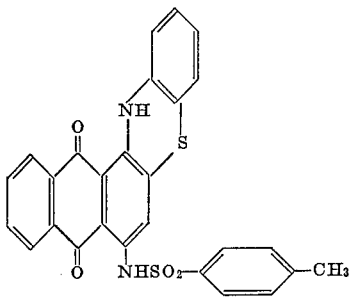

EXAMPLE 2

1 - amino-2-bromo-4-phenylsulfonamidoanthraquinone (4.57 g.), p-chloro-o-nitrobenzenethiol (1.9 g.) and N,N-dimethylformamide (100 ml.) are refluxed and stirred 1.5 hr. The mixture is allowed to cool and then drowned into water containing 10 ml. acetic acid. The product is collected by filtration and washed with water and then acetone. The dried material then is recrystallized from nitrobenzene. The product, 3-chloro-7-phenylsulfonamidophthaloylphenothiazine, gives dyeings having excellent light and sublimation fastness.

EXAMPLE 3

1-amino - 2 - bromo-4-p-toluenesulfonamidoanthraquinone (4.71 g.), 4-methyl-2-nitrobenezenethiol (2.5 g.), potassium carbonate (2.0 g.), and N,N-dimethylformamide (100 ml.) are refluxed for 2.4 hr. The reaction mixture is allowed to cool and drowned in water. The product is collected by filtration, washed with water and then acetone. It is air dried and recrystallized from nitrobenzene. The product, 3-methyl-7-p-toluenesulfonamidophthaloylphenothiazine, produces fast blue shades on polyester fibers.

EXAMPLE 4

1-amino-2-bromo - 4 - (n-caproylamino)anthraquinone (4.15 g.), o-nitrobenzenethiol (2.33 g.), potassium carbonate (2.07 g.), in N,N-dimethylformamide (50 ml.) are reacted as described above and the product isolated in a similar manner. The product is crystallized from nitrobenzene, collected by filtration, and washed with methanol until a clear blue filtrate results. The product obtained gives greenish-blue dyeings on polyester fibers.

EXAMPLE 5

1-amino-2-bromo-4-acetamidoanthraquinone (3.5 g.), potassium carbonate (2.07 g.), o-nitrobenezethiol (2.01 g.) are reacted as described in the preceding examples to give the 7-acetamidophthaloylphenothiazine, which produces greenish-blue shades on polyester.

EXAMPLE 6

7 - (p-toluenesulfonamido)phthaloylphenothiazine is stirred in 20 ml. of glacial acetic acid at 55° C. To this is added dropwise 1 g. 40% peracetic acid and the reaction mixture kept at 55–64° C. for 0.5 hr. and then allowed to cool. The color changes from blue to violet as the oxidation occurs. The product, 7-(p-toluenesulfonamido)phthaloylphenothiazine-5-oxide, is collected by filtration and washed with acetic acid. It melts at 220–225° C. with decomposition. Further heating or higher temperature results in formation of considerable amount of the 5,5-dioxide derivative. This prdouct dyes polyester fibers violet shades.

EXAMPLE 7

7 - benzenesulfonamidophthaloylphenothiazine (0.1 g.) and acetic acid (200 ml.) are heated to 90° C. with stirring. To this is added dropwise 30% hydrogen peroxide (7.5 ml.) and then the reaction heated at 90–95° C. for 1 hr. After allowing to cool, the product in the form of lustrous black crystals, is collected by filtration. The product, 7 - benzenesulfonamidophthaloylphenothiazine-5,5-dioxide, is violet in methyl cellulose solution and melts at 274–275° C.

*Analysis.*— Calcd. (percent): C, 60.5; H, 3.1; N, 5.4. Found (percent): C, 60.8; H, 3.4; N, 5.3.

EXAMPLE 8

7 - (p-ethylphenylsulfonamido)phthaloylphenothiazine (0.1 g.) is stirred in glacial acetic acid (200 ml.) at 90° C. and 30% hydrogen peroxide (7.5 ml.) is added dropwise. The reaction is heated 1 hr. at 90–95° C. and then allowed to cool. The color changes from blue to violet during oxidation. The product, 7-(p-ethylphenylsulfonamido)-phthaloylphenothiazine-5,5-dioxide, is collected by filtration and recrystallized from nitrobenzene. It melts at 258–260° C.

*Analysis.*—Calc'd. (percent): C, 62.0; H, 3.7; N, 5.1; S, 11.8. Found (percent): C, 62.0; H, 3.8; N, 4.8; S, 11.8.

The product dyes polyester fibers violet shades and has excellent fastness properties.

EXAMPLE 9

7 - (p-toluenesulfonamido)phthaloylphenothiazine (6.0 g.) is stirred in acetic acid (700 ml.) at 90° C. and 30% hydrogen peroxide (35 ml.) is added at 90° C. The reaction is heated 1 hr. at 95–100° C. and allowed to cool. The product, 7 - (p-toluenesulfonamido)phthaloylphenothiazine-5,5-dioxide, is collected by filtration and washed with methanol. It produces violet shades when applied to polyester fibers.

EXAMPLE 10

1.0 g. 3-chloro - 7 - (n-caproylamino)phthaloylphenothiazine is oxidized in acetic acid with hydrogen peroxide as described in the preceding examples and the product isolated in a similar manner. The product, 3-chloro-7-(n-caproylamino)phthaloylphenothiazine - 5,5 - dioxide, produces violet shades on polyester fibers.

EXAMPLE 11

Leuco-1,4-diaminoanthraquinone (10.0 g.), o-aminobenzenethiol (20.0 ml.), and methyl cellosolve (150 ml.) are refluxed together for 8 hr. The reaction is allowed to cool and the product collected by filtration, washed with methanol, and recrystallized from nitrobenzene. The product, 7-aminophthaloylphenothiazine, melts at 310–312° C.

*Analysis.*—Calcd. (percent): C, 69.8; H, 3.5; N, 8.1; S, 9.3. Found (percent): C, 69.0; H, 4.0; N, 7.6; S, 9.35.

This compound may also be prepared by reacting 2-bromo-1,4-diaminoanthraquinone with o - nitrobenzenethiol in presence of potassium carbonate in N,N-dimethylformamide as previously indicated. Also, the 7-acylamidophthaloylphenothiazene may be hydrolyzed to the free amine in sulfuric acid. This dye colors polyamide fibers a greenish-blue shade having good fastness properties.

EXAMPLE 12

2 - bromo - 1,4 - diaminoanthraquinone (3.17 g.), 4-chloro-2-nitrobenzenethiol (2.85 g.), potassium carbonate (1.5 g.), and N,N-dimethylformamide (50 ml.) are refluxed for 2 hr. The reaction mixture is drowned into water. The product is collected by filtration and washed with methanol until filtrate is blue. It is recrystallized from nitrobenzene, collected by filtration, and washed with methanol. The product, 7-amino-3-chlorophthaloylphenothiazine, melts at 292–297° C.

*Analysis.*—Calcd. (percent): C, 63.5; H, 2.9; N, 7.4. Found (percent): C, 63.7; H, 3.2; N, 7.3.

The product produces turquoise shades when dyed on polyamide and polyester fibers.

EXAMPLE 13

3 - methyl 7 - (p-toluenesulfonamid)phthaloylphenothiazine (0.25 g.) is dissolved in 3 ml. conc. $H_2SO_4$ and stirred at 50–55° C. for 5 min. The reaction mixture is drowned into water and the product, 7-amino-3-methylphthaloylphenothiazine, collected by filtration, washed with water, and air dried. It produces turquoise shades on polyamide fibers and has good fastness properties.

EXAMPLE 14

7 - (p - toluenesulfonamido)phthaloylphenothiazine-5-oxide (1.0 g.), prepared as described in Example 6, is stirred in 10 ml. conc. $H_2SO_4$ at 25–30° C. for 15 min. The product, 7 - aminophthaloylphenothiazine - 5 - oxide, is drowned into water and collected by filtration, washed with water and air dried. It produces blue shades on polyamide and polyester fabrics.

EXAMPLE 15

7 - (p - toluenesulfonamido)phthaloylphenothiazine-5,5-dioxide (4.0 g.) is added portionwise to 40 ml. conc. $H_2SO_4$ with stirring. The reaction is stirred at 25–30° C. for 10 min. and then drowned in water. The product is collected by filtration, washed with water, and air dried. After recrystallization from nitrobenzene, the product, 7-aminophthaloylphenothiazine - 5,5 - dioxide, melts at 306–308° C. It dyes polyester fabric bright blue shades and possesses excellent fastness to light and sublimation.

*Analysis.*—Calcd. (percent): C, 63.3; H, 3.4; N, 7.1; S, 7.8.

EXAMPLE 16

7 - (p - toluenesulfonamido)phthaloylphenothiazine (1.0 g.), potassium carbonate (1.0 g.), iodoethane (3.0 ml.) and N,N-diamethylformamide are mixed and heated on steam bath for 1.5 hr. with stirring. The reaction is drowned in water and the intermediate product collected by filtration and air dried. The intermediate product, 7-(N-ethyl-p - toluenesulfonamido)phthaloylphenothiazine, (1.0 g.) is stirred in 10 ml. of conc. $H_2SO_4$ for 10 min. at room temperature. The reaction mixture is drowned in water and the product collected by filtration, washed with water, and air dried. The product, 7 - ethylaminophthaloylphenothiazine, imparts green shades to polyamide fibers.

EXAMPLE 17

7 - (p - toluenesulfonamido)phthaloylphenothiazine-5,5-dioxide (2.0 g.), potassium carbonate (2.0 g.), iodoethane (5.0 ml.), and N.N-dimethylformamide (50 ml.) are heated on steam bath for 30 min. The reaction mixture is drowned in water, the intermediate product is collected by filtration and air dried. The intermediate product (2.0 g.) is added to 20 ml. conc. $H_2SO_4$ and stirred at 25–30° C. for 15 min. The solution is drowned in 400 ml. and the product collected by filtration, washed with water, and air dried. The compound obtained, 7-ethylaminophthaloylphenothiazine-5,5 - dioxide, produces turquoise shades on polyester fibers.

EXAMPLE 18

1.0 g. 7 - aminophthaloylphenothiazine-5,5-dioxide, 40 ml. acetic acid, and 6 ml. epichlorohydrin are heated and stirred at 95° C. for 24 hr. The reaction mixture is allowed to cool and the small amount of insoluble material is filtered off. The blue filtrate is drowned into water and the product collected by filtration, washed with water and air dried. This dye, 7-(3-chloro-2-hydroxypropylamino)-phthaloylphenothiazine-5,5-dioxide, colors cellulose acetate and ployester fibers blue shades and has excellent light, sublimation, and gas fastness.

EXAMPLE 19

1-amino-2-bromo - 4 - anilinoanthraquinone (3.93 g.), o-nitrobenzenethiol (2.0 g.), potassium carbonate (1.5 g.), and 50 ml. N.N-dimethylformamide are heated at reflux for 1 hr. The reaction mixture is allowed to cool and drowned into water. The product, 7-anilinophthaloylphenothiazine, is collected by filtration, washed with water and then methanol. The product produces green shades on polyesters and polyamide fibers. This compound can also be prepared by reaction of 7-aminophthalolyl phenothiazine with bromobenzene in the presence of copper catalyst.

EXAMPLE 20

1-amino - 2 - bromo - 4 - (m-hydroxymethylanilino) anthraquinone (4.23 g.) o-nitrobenzenethiol (2.33 g.) $K_2CO_3$ (2.07 g.), and N,N-dimethylformamide (50 ml.) were refluxed for 30 min. The reaction mixture was allowed to cool and drowned in water. The precipitate is collected by filtration, washed with acetone, and air dried. The product 7-(m-hydroxyethylanilino)phthaloylphenothiazine dyes ployester and polyamide fibers green.

EXAMPLE 21

7 - aminophthaloylphenothiazine-5,5-dioxide (1.0 g.), potassium acetate( 1.0 g.), copper bronze (0.1 g.), cupric chloride (0.1 g.), bromobenzene (20 ml.) are refluxed for 6 hr. with stirring. The excess bromobenzene is removed by steam distillation and the product recrystallized from nitrobenzene. The product, 7-anilinophthalolylphenothiazine-5,5-dioxide, dyes polyester fibers fast green shades.

The novel phthaloylphenothiazine compounds set forth in the following table are prepared according to the procedure described in the preceding examples and conform to Formula I.

TABLE

| Example No. | R | R¹ | X | Color on polyester |
|---|---|---|---|---|
| 22 | —$SO_2C_6H_5$ | H | —S— | Blue. |
| 23 | —$SO_2C_6H_4$-p-Cl | H | —S— | Do. |
| 24 | —$SO_2C_6H_4$-p-$OCH_3$ | H | —S— | Do. |
| 25 | —$SO_2C_6H_4$-p-$NHCOCH_3$ | H | —S— | Do. |
| 26 | —$SO_2C_6H_4$-p-$C_2H_5$ | H | —S— | Do. |
| 27 | —$SO_2C_6H_4$-p-$C_2H_5$ | 3-Cl | —S— | Do. |
| 28 | —$SO_2C_6H_5$ | 3-$CH_3$ | —S— | Do. |
| 29 | —$SO_2C_6H_4$-p-$CH_3$ | 3-$NO_2$ | —S— | Do. |
| 30 | —$SO_2C_6H_4$-p-$CH_3$ | 2-$CH_3$ | —S— | Do. |
| 31 | —$SO_2C_6H_4$-p-$CH_3$ | 2-Cl | —S— | Do. |
| 32 | —$SO_2C_6H_4$-p-$CH_3$ | 4-$CH_3$ | —S— | Do. |
| 33 | —$SO_2C_6H_4$-p-$CH_3$ | 2, 3-di-Cl | —S— | Do. |
| 34 | —$SO_2C_6H_4$-p-$CH_3$ | 1-$NO_2$ | —S— | Do. |
| 35 | —$SO_2C_6H_4$-p-$CH_3$ | 3-$NHCOCH_3$ | —S— | Do. |
| 36 | —$SO_2C_6H_4$-p-$CH_3$ | 3-$SO_2NHC_2H_4OH$ | —S— | Do. |
| 37 | —$SO_2C_6H_4$-p-$CH_3$ | 3-Cl | —S— | Do. |
| 38 | —$SO_2C_6H_4$-p-$CH_3$ | 3-$OCH_3$ | —S— | Do. |
| 39 | —$SO_2C_6H_4$-p-$CH_3$ | 3-$SO_2N(CH_3)_2$ | —S— | Do. |
| 40 | —$SO_2C_6H_4$-p-$CH_3$ | 3-$SO_2NH_2$ | —S— | Do. |
| 41 | —$SO_2C_6H_4$-p-$CH_3$ | 3-$COOC_2H_5$ | —S— | Do. |
| 42 | —$SO_2C_6H_4$-p-$CH_3$ | 3-$CF_3$ | —S— | Do. |
| 43 | —$SO_2C_6H_4$-p-$CH_3$ | 3-$C_6H_5$ | —S— | Do. |
| 44 | —$SO_2C_6H_4$-p-$CH_3$ | 3-$C_2H_4OH$ | —S— | Do. |

TABLE—Continued

| Example No. | R | R¹ | X | Color on polyester |
|---|---|---|---|---|
| 45 | —COCH$_3$ | 3-Cl | —S— | Do. |
| 46 | —COOC$_2$H$_5$ | 3-CH$_3$ | —S— | Do. |
| 47 | —COCH$_2$Cl | H | —S— | Do. |
| 48 | —CO(CH$_2$)$_4$CH$_3$ | 3-Cl | —S— | Do. |
| 49 | —CO(CH$_2$)$_4$CH$_3$ | 2-CH$_3$ | —S— | Do. |
| 50 | —CO(CH$_2$)$_4$CH$_3$ | 3-SO$_2$CH$_3$ | —S— | Do. |
| 51 | —CO(CH$_2$)$_4$CH$_3$ | 3-NHCOCH$_3$ | —S— | Do. |
| 52 | —COC$_6$H$_5$ | H | —S— | Do. |
| 53 | —COC$_6$H$_4$-p-Cl | H | —S— | Do. |
| 54 | —COC$_6$H$_4$-p-CH$_3$ | 3-Cl | —S— | Do. |
| 55 | —COC$_6$H$_4$-m-Cl | 3-CH$_3$ | —S— | Do. |
| 56 | —COC$_6$H$_4$-p-NO$_2$ | H | —S— | Do. |
| 57 | —COC$_6$H$_{11}$ | H | —S— | Do. |
| 58 | —CONHC$_6$H$_5$ | H | —S— | Do. |
| 59 | —CONHC$_2$H$_5$ | H | —S— | Do. |
| 60 | —SO$_2$CH$_2$CH$_3$ | H | —S— | Do. |
| 61 | —SO$_2$C$_2$H$_4$Cl | H | —S— | Do. |
| 62 | —SO$_2$C$_4$H$_9$-n | H | —S— | Do. |
| 63 | —SO$_2$C$_6$H$_5$ | H | —SO— | Violet. |
| 64 | —SO$_2$C$_6$H$_4$-p-Cl | H | —SO— | Do. |
| 65 | —SO$_2$C$_6$H$_4$-p-Cl | 3-Cl | —SO— | Do. |
| 66 | —CO(CH$_2$)$_4$CH$_3$ | 3-Cl | —SO— | Do. |
| 67 | —COOC$_2$H$_5$ | 3-CH$_3$ | —SO— | Do. |
| 68 | —SO$_2$C$_2$H$_5$ | H | —SO— | Do. |
| 69 | —SO$_2$C$_6$H$_4$-p-C. | H | —SO$_2$— | Do. |
| 70 | —SO$_2$CH$_3$ | H | —SO$_2$— | Do. |
| 71 | —COOC$_2$H$_5$ | H | —SO$_2$— | Do. |
| 72 | —SO$_2$C$_6$H$_4$-p-C$_2$H$_5$ | 3-Cl | —SO$_2$— | Do. |
| 73 | —SO$_2$C$_6$H$_5$ | 3-Cl | —SO$_2$— | Do. |
| 74 | —SO$_2$C$_6$H$_4$-p-CH$_3$ | 3-Cl | —SO$_2$— | Do. |
| 75 | —SO$_2$C$_6$H$_4$-p-CH$_3$ | 3-CH$_3$ | —SO$_2$— | Do. |
| 76 | —SO$_2$C$_6$H$_4$-p-CH$_3$ | 3-NO$_2$ | —SO$_2$— | Do. |
| 77 | —SO$_2$C$_6$H$_4$-p-CH$_3$ | 3-NHCOCH$_3$ | —SO$_2$— | Do. |
| 78 | —SO$_2$C$_6$H$_4$-p-CH$_3$ | 2-CH$_3$ | —SO$_2$— | Do. |
| 79 | —SO$_2$C$_6$H$_4$-p-CH$_3$ | 3-CF$_3$ | —SO$_2$— | Do. |
| 80 | —SO$_2$C$_6$H$_4$-p-CH$_3$ | 3-OCH$_3$ | —SO$_2$— | Do. |
| 81 | H | 3-Cl | —SO$_2$— | Blue. |
| 82 | H | 3-CH$_3$ | —SO$_2$— | Do. |

| Example No. | R | R¹ | X | Color on Polyamide |
|---|---|---|---|---|
| 83 | H | 3-NHCOCH$_3$ | —S— | Green. |
| 84 | H | 3-NO$_2$ | —S— | Blue. |
| 85 | H | 3-CH$_2$CH$_2$OH | —S— | Turquoise. |
| 86 | H | 3-CH$_2$CHCl | —S— | Do. |
| 87 | H | 2-CH$_3$ | —S— | Blue. |
| 88 | H | 2-Cl | —S— | Do. |
| 89 | H | 3-NH$_2$ | —S— | Green. |
| 90 | H | 3-COOC$_2$H$_5$ | —S— | Blue. |
| 91 | H | 1-NO$_2$ | —S— | Do. |
| 92 | H | 3-CF$_3$ | —S— | Do. |
| 93 | H | 3-OCH$_3$ | —S— | Green. |
| 94 | H | 3-SO$_2$NHC$_2$H$_4$OH | —S— | Do. |
| 95 | H | 3-CH$_3$ | —SO— | Do. |
| 96 | H | 3-Cl | —SO— | Do. |
| 97 | H | 3-NO$_2$ | —SO— | Do. |
| 98 | H | 4-CH$_3$ | —SO— | Do. |

| Example No. | R | R¹ | X | Color on Polyester |
|---|---|---|---|---|
| 99 | H | 3-NHCOCH$_3$ | —SO$_2$— | Blue. |
| 100 | H | 3-NO$_2$ | —SO$_2$— | Do. |
| 101 | H | 3-COOC$_2$H$_5$ | —SO$_2$— | Do. |
| 102 | H | 3-CF$_3$ | —SO$_2$— | Do. |
| 103 | H | 4-CH$_3$ | —SO$_2$— | Do. |
| 104 | H | 3-C$_2$H$_4$OH | —SO$_2$— | Do. |
| 105 | H | 3-OCH$_3$ | —SO$_2$— | Do. |
| 106 | H | 3-C$_2$H$_4$Cl | —SO$_2$— | Do. |
| 107 | H | 2-Cl | —SO$_2$— | Do. |
| 108 | H | 3-SO$_2$CH$_3$ | —SO$_2$— | Do. |
| 109 | H | 3-C$_6$H$_5$ | —SO$_2$— | Do. |
| 110 | H | 1-NO$_2$ | —SO$_2$— | Do. |
| 111 | H | 1-NH$_2$ | —SO$_2$— | Do. |
| 112 | H | 4-Cl | —SO$_2$— | Do. |
| 113 | H | 2,3-di-CH$_3$ | —SO$_2$— | Do. |
| 114 | H | 3-NHCOOC$_2$H$_5$ | —SO$_2$— | Do. |
| 115 | H | 3-Br | —SO$_2$— | Do. |
| 116 | H | 3-CH$_2$CH$_2$CH$_2$CH$_3$ | —SO$_2$— | Do. |
| 117 | H | 3-C$_2$H$_5$ | —SO$_2$— | Do. |
| 118 | H | 3-CH(CH$_3$)$_2$ | —SO$_2$— | Do. |
| 119 | H | 3-OC$_6$H$_5$ | —SO$_2$— | Do. |

| Example No. | R | R¹ | X | Color on Polyamide |
|---|---|---|---|---|
| 120 | —CH$_3$ | H | —S— | Green. |
| 121 | —CH$_2$CH$_2$CH$_3$ | H | —S— | Do. |
| 122 | —C$_6$H$_{11}$ | H | —S— | Do. |
| 123 | —CH$_2$CH$_2$CH$_2$CH$_3$ | H | —S— | Do. |
| 124 | —CH$_2$CH$_2$OH | H | —S— | Do. |
| 125 | —CH$_3$ | 3-CH$_3$ | —S— | Do. |
| 126 | —C$_2$H$_5$ | 3-CH$_3$ | —S— | Do. |
| 127 | —C$_2$H$_5$ | 3-Cl | —S— | Turquoise. |
| 128 | —C$_2$H$_5$ | 3-NO$_2$ | —S— | Blue. |
| 129 | —C$_2$H$_5$ | 3-C$_2$H$_5$ | —S— | Green. |
| 130 | —C$_2$H$_5$ | 3-CH$_2$CH$_2$OH | —S— | Do. |
| 131 | —C$_2$H$_5$ | 3-Br | —S— | Do. |
| 132 | —C$_2$H$_5$ | 1-NO$_2$ | —S— | Blue. |
| 133 | —CH$_2$CH$_2$OOCCH$_3$ | H | —S— | Green. |
| 134 | —CH$_2$CH$_2$NHCOCH$_3$ | H | —S— | Do. |
| 135 | —CH$_2$CH$_2$Cl | H | —S— | Do. |
| 136 | —CH$_3$ | H | —SO— | Do. |
| 137 | —C$_2$H$_5$ | H | —SO— | Do. |
| 138 | —CH$_2$CH$_2$CH$_2$CH$_3$ | 3-CH$_3$ | —SO— | Do. |
| 139 | —CH$_2$CH$_2$CH$_2$CH$_3$ | 3-Cl | —SO— | Blue. |

TABLE—Continued

| Example No. | R | R¹ | X | Color on polyester |
|---|---|---|---|---|
| 140 | $-CH_3$ | H | $-SO_2-$ | Blue. |
| 141 | $-CH_2CH_2OH$ | H | $-SO_2-$ | Do. |
| 142 | $-CH_2CH_2CH_2CH_3$ | H | $-SO_2-$ | Do. |
| 143 | $-CH_2CH_2CH_3$ | H | $-SO_2-$ | Do. |
| 144 | $-CH_2CH_2OOCCH_3$ | H | $-SO_2-$ | Do. |
| 145 | $-CH_2CH_2NHCOCH_3$ | H | $-SO_2-$ | Do. |
| 146 | $-C_6H_{11}$ | H | $-SO_2-$ | Do. |
| 147 | $-CH_3$ | 3-$CH_3$ | $-SO_2-$ | Turquoise. |
| 148 | $-C_2H_5$ | 3-$CH_3$ | $-SO_2-$ | Do. |
| 149 | $-CH_2CH(OH)CH_2Cl$ | 3-$CH_3$ | $-SO_2-$ | Do. |
| 150 | $-CH_2CH_2CH_2CH_3$ | 3-$CH_3$ | $-SO_2-$ | Do. |
| 151 | $-CH_3$ | 3-Cl | $-SO_2-$ | Blue. |
| 152 | $-C_2H_5$ | 3-Cl | $-SO_2-$ | Do. |
| 153 | $-C_2H_5$ | 3-$NO_2$ | $-SO_2-$ | Do. |
| 154 | $-C_2H_5$ | 3-$CH_2CH_2OH$ | $-SO_2-$ | Turquoise. |
| 155 | $-C_2H_5$ | 3-$CH_2CH_2CH_2CH_3$ | $-SO_2-$ | Do. |
| 156 | $-C_2H_5$ | 2-Cl | $-SO_2-$ | Blue. |
| 157 | $-C_2H_5$ | 1-$CH_3$ | $-SO_2-$ | Do. |
| 158 | $-C_2H_5$ | 4-$CH_3$ | $-SO_2-$ | Do. |
| 159 | $-C_6H_4\text{-}O\text{-}CH_3$ | H | $-S-$ | Green. |
| 160 | $-C_6H_4\text{-}m\text{-}CH_3$ | H | $-S-$ | Do. |
| 161 | $-C_6H_4\text{-}p\text{-}CH_3$ | H | $-S-$ | Do. |
| 162 | $-C_6H_4\text{-}p\text{-}CH_2CH_2OH$ | H | $-S-$ | Do. |
| 163 | $-C_6H_4\text{-}p\text{-}Cl$ | H | $-S-$ | Do. |
| 164 | $-C_6H_4\text{-}p\text{-}CF_3$ | H | $-S-$ | Do. |
| 165 | $-C_6H_4\text{-}p\text{-}NHCOCH_3$ | H | $-S-$ | Do. |
| 166 | $-C_6H_4\text{-}p\text{-}OCH_3$ | H | $-S-$ | Do. |
| 167 | $-C_6H_4\text{-}p\text{-}\overline{NCOCH_2CH_2CH_2}$ | H | $-S-$ | Do. |
| 168 | $-C_6H_3\text{-}2,5\text{-di-}CH_3$ | H | $-S-$ | Do. |
| 169 | $-C_6H_3\text{-}2,5\text{-di-}C_2H_5$ | H | $-S-$ | Do. |
| 170 | $-C_6H_5$ | 3-Cl | $-S-$ | Do. |
| 171 | $-C_6H_5$ | 3-$CH_3$ | $-S-$ | Do. |
| 172 | $-C_6H_5$ | 3-$NO_2$ | $-S-$ | Do. |
| 173 | $-C_6H_5$ | 3-$SO_2NHC_2H_5$ | $-S-$ | Do. |
| 174 | $-C_6H_5$ | 3-$SO_2CH_3$ | $-S-$ | Do. |
| 175 | $-C_6H_5$ | 3-$CF_3$ | $-S-$ | Do. |
| 176 | $-C_6H_4\text{-}p\text{-}Br$ | 2-$CH_3$ | $-S-$ | Do. |
| 177 | $-C_6H_3\text{-}m,p\text{-di-}CH_3$ | 1-$NO_2$ | $-S-$ | Do. |
| 178 | $-C_6H_4\text{-}m\text{-}CH_2OH$ | 4-$CH_3$ | $-S-$ | Do. |
| 179 | $-C_6H_4\text{-}m\text{-}CH_2OH$ | 4-$COOC_2H_5$ | $-S-$ | Do. |

The compounds of the invention can be used for dyeing hydrophobic fibers such as linear polyester, cellulose ester, modacrylic, polyamide, etc., fibers in the manner described in U.S. Pats. 2,880,050, 2,757,064; 2,782,187 and 3,043,827. The following example illustrates a method by which the compounds of the invention can be used to dye polyester textile materials.

EXAMPLE 180

The phthaloylphenothiazine compound of Example 18 (0.1 g.) is dissolved in 10 cc. of 2-methoxyethanol. A small amount (3–5 cc.) of a 3% sodium lignin sulfonate aqueous solution is added, with stirring, and then the volume of the bath is brought to 300 cc. with water. 3 cc. of a solvent carrier (Tanavol) is added to the bath and 10 grams of a textile fabric made of poly(ethylene terephthalate) fibers is placed in the bath and worked 10 minutes without heat. The dyeing is carried out at the boil for one hour. The dyed fabric is removed from the dyebath and scoured for 20 minutes at 80° C. in a solution containing 1 g./l. neutral soap and 1 g./l. sodium carbonate. The fabric is then rinsed, dried in an oven at 250° F. and heat set (for the removal of residual carrier) for 5 minutes at 350° F.

When the compounds of the invention are used to dye polyamide textile materials, the above procedure can be employed except the "Tanavol" dyeing assistant and heat setting step are omitted. Cellulose acetate fibers are dyed with the compounds similarly to the dyeing of polyamide fibers except that the dyeing is carried out at 80° C. for 1 hr. rather than at the boil.

The compounds of the invention can also be applied to polyester textile materials by the heat fixation technique described in U.S. Pat. 2,663,612 and in the American Dyestuff Reporter, 42, 1 (1953). The following procedure describes how the anthraquinone compounds of the invention can be applied to polyester materials by the heat fixation technique.

EXAMPLE 162

A mixture of 500 mg. of the compound of Example 1, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a micro-size container (an accessory for a 1-quart size Szegvari Attritor) for approximately 3.5 hours. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring.

A thickener and penetrating mixture is prepared by mixing 1 ml. of a complex diaryl sulfonate surfactant, (compound 8–S), 3 ml. of a 3% solution of a sodium N-methyl-N-oleoyltaurate (Igepon T-S1), 8 ml. of a 25% solution of natural gums (Superclear 80N), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the reservoir of a Butterworth padder where it is heated to about 45–60° C.

10 g. of a fabric of poly(ethylene terephthalate) fibers and 10 g. of a fabric of 65/35 spun poly(ethylene terephthalate)/cotton fibers are sewn together, end-to-end, and padded for 5 minutes of continuous cycling through the dye mixture and between three rubber squeeze rollers of the padder. Dye mixture pick-up is about 60% based on the weight of the fabrics.

The padded fabrics are then dried at 200° F. and then heat-fixed for 2 minutes at 415° F. in a forced air oven. The dyed fabrics are scoured for 20 minutes at 65–70° C. in a solution containing 0.2% sodium hydrosulfide, 0.2% sodium carbonate and 1.7% of a 3% solution of sodium N-methyl-N-oleoyltaurate and then dried. The dyed fabrics possess excellent brightness and exhibit outstanding fastness to light and sublimation when tested according to the procedures described in the 1966 edition of the Technical Manual of the American Association of Textile Chemists and Colorists.

The heat fixation dyeing procedure described above can be varied by the substitution of other dispersing agents, surfactants, suspending agents, thickeners, etc. The temperature and time of the heat-fixation step can also be varied.

Polymeric linear polyester materials of the terephthalate sold under the trademarks "Kodel," "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,446. Poly(ethylene terephthalate) polyester fibers are described, for example in U.S. Pat. 2,465,319. The polymeric linear polyester materials disclosed in U.S. Pats. 2,945,010; 2,957,745; and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These inherent viscosities are measured at 25° C. using 0.25 g. polymer per 100 ml. of a solvent consisting of 60% phenol and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc.

Examples of the polyamide fibers that can be dyed with the compounds of the invention are those consisting of nylon 66, made by the polymerization of adipic acid and hexamethylenediamine, nylon 6, prepared from epsilon-aminocaproic acid lactam, and nylon 8. The cellulose acetate fibers that can be dyed with the compounds of the invention include fibers consisting of either cellulose triacetate or partially hydrolyzed cellulose acetate.

The invention has been described in detail with particular reference to preferred embodiments thereof, but it will be understood that variations and modifications can be effected within the spirit and scope of the invention.

We claim:
1. A water-insoluble compound having the formula

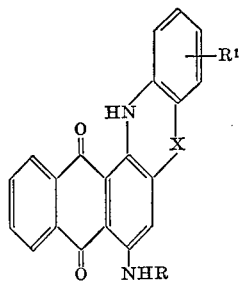

wherein
R is hydrogen; alkyl having 1 to about 6 carbon atoms; lower alkyl substituted with halogen, hydroxy, lower alkoxy, lower alkanoyloxy, cyano, lower alkanoylamido, or phenyl; cyclohexyl; phenyl; phenyl substituted with lower alkyl, lower hydroxyalkyl, lower alkoxy-loweralkyl, lower alkoxy, hydroxy, halogen, trifluoromethyl, lower alkanoylamino, or 2-pyrrolidinono; formyl; lower alkanoyl; lower alkanoyl substituted with halogen, phenyl, cyano, lower alkoxy, lower alkylthio, or lower alkylsulfonyl; benzoyl; benzoyl substituted with lower alkyl, lower alkoxy, or halogen; cyclohexylcarbonyl; lower alkoxycarbonyl; lower alkoxycarbonyl substituted with cyano or hydroxy; phenoxycarbonyl; phenoxycarbonyl substituted with lower alkyl, lower alkoxy, or halogen; lower alkylsulfonyl; lower alkylsulfonyl substituted with cyano, hydroxy, or lower alkoxy; phenylsulfonyl; phenylsulfonyl substituted with lower alkyl, lower alkoxy, halogen or lower alkanoylamino; carbamoyl; lower alkylcarbamoyl; di-lower alkylcarbamoyl; phenylcarbamoyl; or phenyl carbamoyl substituted with lower alkyl, lower alkoxy, or halogen;
$R^1$ is hydrogen, lower alkyl, lower hydroxyalkyl, lower haloalkyl, lower alkoxy, halogen, phenyl, amino, lower alkanoylamino, lower alkylsulfonamido, lower alkylsulfonyl, sulfamoyl, lower alkylsulfamoyl, lower alkoxycarbonyl, nitro, or trifluoromethyl; and
X is —S—, —SO—, or —$SO_2$—.

2. A compound according to claim 1 wherein
R is hydrogen; lower alkyl; lower alkyl substituted with hydroxy, halogen, lower alkoxy, cyano, or lower alkanoyloxy; phenyl; phenyl substituted with lower alkyl, lower alkoxy, or halogen; lower alkylsulfonyl; phenylsulfonyl; or phenylsulfonyl substituted with lower alkyl, lower alkoxy or halogen;
$R^1$ is hydrogen, lower alkyl, lower alkoxy, or halogen; and
X is —S— or —$SO_2$—.

3. A compound according to claim 1 wherein
R is hydrogen; lower alkyl; lower alkyl substituted with hydroxy or halogen; phenyl; phenylsulfonyl; or p-tolylsulfonyl;
$R^1$ is hydrogen or halogen; and
X is —S— or —$SO_2$—.

4. A compound according to claim 1 wherein
R is hydrogen or 3-chloro-2-hydroxypropyl;
$R^1$ is hydrogen or 3-chloro; and
X is —$SO_2$—.

5. A compound according to claim 1 wherein
R is hydrogen or ethyl;
$R^1$ is hydrogen; and
X is —S—.

References Cited
UNITED STATES PATENTS 2,035,620 3/1936 Semon ............ 260—243
3,337,545 8/1967 Zirkle ............ 260—243

HENRY R. JILES, Primary Examiner
J. M. FORD, Assistant Examiner

U.S. Cl. X.R.
8—40